April 4, 1950  C. D. SCHERMULY ET AL  2,502,595
MOLD
Filed May 5, 1947

INVENTORS
CONRAD DAVID SCHERMULY
ALFRED JAMES SCHERMULY
CHARLES SCHERMULY
By their attorneys
Howson and Howson Patented Apr. 4, 1950

2,502,595

UNITED STATES PATENT OFFICE 2,502,595

MOLD

Conrad David Schermuly, Alfred James Schermuly, and Charles Schermuly, Parkgate, Newdigate, England Application May 5, 1947, Serial No. 745,966
In Great Britain June 3, 1939

Section 1, Public Law 690, August 8, 1946
Patent expires June 3, 1959

7 Claims. (Cl. 18—34)

This invention relates to moulds more particularly of the kind used for moulding explosive substances for use in Verey lights, rockets, cartridges and the like. Hitherto it has been usual to mould explosives for the aforesaid purposes in a single mould which, it will be appreciated, restricts the speed of output. It has also been proposed to use a multiple mould, that is to say a mould capable of forming a number of charges simultaneously. This type of mould comprises two heavy complementary members each forming one half of the mould, the said members being held together during the moulding by means of bolts at each end thereof. This type of multiple mould has the disadvantage in that when pressure is brought to bear on the charge during the moulding process the sides of the mould tend to bow outwardly and difficulty is also experienced in removing the moulded charges therefrom due to the fact that each half of the mould encloses half of the pressed charge.

The principal object of the present invention is to provide a multiple mould in which any convenient number of charges can be formed simultaneously and from which the said charges can easily be removed.

The present invention consists in a sectional mould having a plurality of moulding apertures, the mould being divided along lines running from one aperture to the next and from each aperture to the periphery of the mould to form sections each having portions of the peripheries of more than one aperture therein, each of the said portions comprising less than one half of the periphery of a complete aperture.

Figure 1:
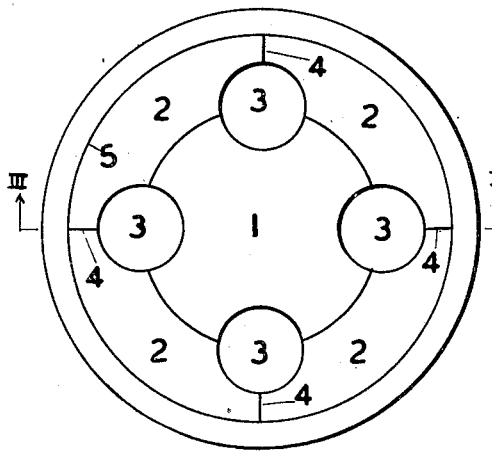
Figure 2:
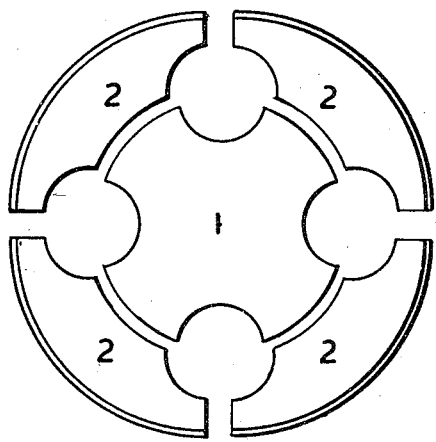
Figure 3:
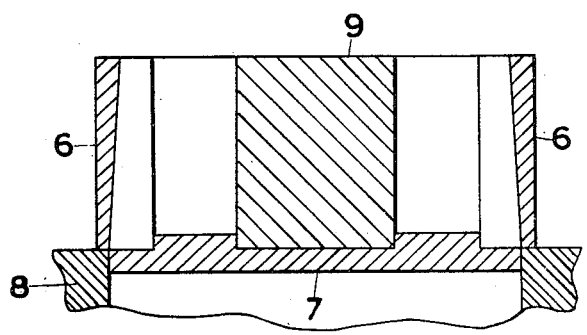

A convenient form of the invention will hereinafter be described with reference to the accompanying drawing in which Figure 1 shows a plan of the mould, Figure 2 shows a plan of the mould with the sections opened out and Figure 3 shows a section on the line III—III, Figure 1.

In the particular illustrations shown in the accompanying drawing the mould is shown circular in plan view. While this is a preferred shape for the reason of strength and ease of construction it will be understood that the mould may be of any other convenient shape.

Referring to the drawing, the mould comprises an inner element 1 surrounded by elements 2. A number of moulding apertures 3 are formed in the elements 1 and 2 the centres of which apertures are placed at the point of division of the elements 1 and 2. In the particular example shown the centres of the apertures fall on a circle concentric with the mould, the said circle forming the division between the elements 1 and 2, thereby dividing the mould on lines from one aperture to the next. The division of the elements 2 is at the points 4 which are radially arranged with respect to the mould, the said division extending from each aperture 3 to the periphery 5 of the mould. In this manner the mould is divided into a number of sections which are shown moved apart in Figure 2, each section having portions of the peripheries of more than one aperture therein. By dividing the mould in the manner hereinbefore described it will be seen that each portion of the periphery of the aperture 3 comprises less than half the periphery of a complete aperture. Thus, when the mould is opened after the charges have been compressed each charge will be held by a section of the mould which surrounds less than half the periphery of the charge thereby permitting the charge to be removed easily therefrom.

In order to hold the sections of the mould together whilst the charges are being compressed, a sleeve 6 is provided the inner face of which is tapered and acts in conjunction with the side of the mould which is correspondingly tapered.

In operation the sections of the mould are placed together and the sleeve 6 placed in position round the said sections. The sleeve is then subjected to pressure so as to lock the sections tightly together by means of the wedging action of the tapered surfaces of the mould and sleeve. The mould is then placed on a foot 7 as shown in Figure 3, the charges inserted and pressed. In order to open the mould the sleeve is placed over an apertured plate 8 and pressure is applied to the upper surface 9 of the mould thus releasing the mould from the sleeve. Thereafter the outer sections of the mould are removed and the charges taken from the central section 6.

Although the apertures shown in the particular example are cylindrical in shape it will be understood that any other convenient shape may be provided; also, any convenient number of apertures may be formed in the mould.

What we claim is:

1. A sectional mould for moulding explosive powders comprising a base plate, an inner section adapted to rest on said base plate and having in its outer wall a plurality of recessed surfaces, a plurality of outer sections adapted to rest on said base plate and each having two recessed surfaces in the inner wall thereof, and means for holding said outer sections against said inner section on said base plate so that one of the recessed surfaces in each of two outer sections form with one of the recessed surfaces in the inner section a moulding receptacle the bottom of which is closed by said base plate and the top of which is open, the relative proportions of said recessed surfaces being such that none of them comprises as much as half of the periphery of the moulding receptacle of which it forms part.

2. A sectional mould for moulding explosive powders as claimed in claim 1 wherein said base plate has a plurality of shallow projections each of which is adapted to project into the lower end of one of said moulding receptacles.

3. A sectional mould for moulding explosive powders as claimed in claim 1 wherein each of said recessed surfaces is arcuate and the moulding receptacles are cylindrical.

4. A sectional mould for moulding explosive powders as claimed in claim 1 wherein said inner section is a cylinder having a plurality of longitudinal recessed surfaces in its curved surface and said outer sections are annular segments each having a longitudinal recessed surface at each end of the inner face thereof.

5. A sectional mould for moulding explosive powders as claimed in claim 4 wherein said base plate has a plurality of shallow projections each of which is adapted to project into the lower end of one of said moulding receptacles.

6. A sectional mould for moulding explosive powders as claimed in claim 4 wherein each of said recessed surfaces is arcuate and the moulding receptacles are cylindrical.

7. A sectional mould for moulding explosive powder as claimed in claim 4 wherein abutting walls of adjacent outer sections are radial to the said inner section and said cylindrical receptacles.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
| --- | --- | --- |
| 224,734 | See | Feb. 17, 1880 |
| 415,251 | Meyer | Nov. 19, 1889 |
| 923,521 | Herron | June 1, 1909 |
| 1,083,841 | Leblanc | Jan. 6, 1914 |
| 1,297,448 | Crate | Mar. 18, 1919 |
| 1,981,580 | Biringer | Nov. 20, 1934 |
| 2,051,653 | Rich | Aug. 18, 1936 |
| 2,292,593 | Amigo | Aug. 11, 1942 |
| 2,352,083 | Detjen | June 20, 1944 |

FOREIGN PATENTS

| Number | Country | Date |
| --- | --- | --- |
| 30,477 | Austria | Oct. 25, 1907 |